US006733351B2

(12) United States Patent
Mashiko

(10) Patent No.: US 6,733,351 B2
(45) Date of Patent: May 11, 2004

(54) INDUCTION SYSTEM FOR MARINE ENGINE

(75) Inventor: Tetsuya Mashiko, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/113,336

(22) Filed: Mar. 29, 2002

(65) Prior Publication Data

US 2003/0045185 A1 Mar. 6, 2003

(30) Foreign Application Priority Data

Sep. 3, 2001 (JP) ....................................... 2001-265369

(51) Int. Cl.[7] .......................... F02M 3/00; B60K 13/02

(52) U.S. Cl. ..................... 440/88 A; 440/88 R; 440/87; 123/339.1; 123/339.13

(58) Field of Search ............................... 440/1, 84, 87, 440/88 R, 88 A; 123/319, 327, 330–333, 338, 339.1–339.27

(56) References Cited

U.S. PATENT DOCUMENTS

| | | | | | |
|---|---|---|---|---|---|
| 4,271,095 | A | * | 6/1981 | Maeda | 261/41.5 |
| 4,413,602 | A | | 11/1983 | Inoue et al. | |
| 4,474,152 | A | * | 10/1984 | Horiuchi et al. | 123/339.13 |
| 5,522,362 | A | * | 6/1996 | Motose | 123/339.13 |
| 5,762,158 | A | * | 6/1998 | Sumner, Jr. | 180/219 |
| 6,015,319 | A | * | 1/2000 | Tanaka | 440/84 |
| 6,098,591 | A | * | 8/2000 | Iwata | 123/339.11 |
| 6,119,653 | A | * | 9/2000 | Morikami | 123/339.23 |
| 6,174,264 | B1 | | 1/2001 | Hoshiba et al. | |
| 6,312,299 | B1 | | 11/2001 | Henmi | |
| 6,375,525 | B1 | * | 4/2002 | Kanno | 440/87 |
| 6,415,766 | B1 | | 7/2002 | Kanno et al. | |
| 6,446,599 | B1 | * | 9/2002 | Nakayasu | 123/339.23 |
| 6,474,298 | B2 | * | 11/2002 | Kanno | 123/339.14 |
| 6,478,638 | B2 | * | 11/2002 | Matsuda et al. | 440/1 |
| 6,491,032 | B1 | * | 12/2002 | Kanno | 123/680 |
| 6,508,680 | B2 | * | 1/2003 | Kanno | 440/1 |
| 6,520,147 | B1 | * | 2/2003 | Kanno | 123/339.23 |
| 6,520,167 | B1 | * | 2/2003 | Kanno | 123/674 |
| 2001/0036777 | A1 | * | 11/2001 | Iida et al. | 440/84 |
| 2001/0042532 | A1 | * | 11/2001 | Aichinger et al. | 123/192.1 |
| 2002/0017277 | A1 | * | 2/2002 | Kanno | 123/406.59 |
| 2002/0112694 | A1 | * | 8/2002 | Kanno et al. | 123/319 |
| 2002/0115357 | A1 | * | 8/2002 | Hiki et al. | 440/1 |
| 2002/0137405 | A1 | * | 9/2002 | Kanno | 440/84 |
| 2002/0164907 | A1 | * | 11/2002 | Kanno | 440/84 |
| 2002/0177940 | A1 | * | 11/2002 | Suzuki et al. | 701/110 |

FOREIGN PATENT DOCUMENTS

| | | | | | |
|---|---|---|---|---|---|
| JP | 58152146 | A | * | 9/1983 | F02D/33/00 |
| JP | 05280357 | A | * | 10/1993 | F02B/33/00 |
| JP | 06117288 | A | * | 4/1994 | F02D/29/06 |
| JP | 06264800 | A | * | 9/1994 | F02D/41/22 |

OTHER PUBLICATIONS

U.S. patent application No. 10/080,371 filed Feb. 15, 2002 entitled "Engine Control For Watercraft".
U.S. patent application No. 09/708,900 filed Nov. 8, 2002 entitled "Marine Engine Control System.".
U.S. patent application No. 09/688,534 filed Oct. 16, 2000 entitled "Idle Speed Control Valve Control System.".

* cited by examiner

*Primary Examiner*—S. Joseph Morano
*Assistant Examiner*—Ajay Vasudeva
(74) *Attorney, Agent, or Firm*—Knobbe, Martens, Olson & Bear LLP

(57) ABSTRACT

An induction system for a marine engine is provided. The induction system selectively provides additional intake air to the watercraft when a rider docks the watercraft. The additional intake air provides docking thrust to the watercraft, enabling the rider to more easily maneuver the watercraft during a docking maneuver, for example.

11 Claims, 9 Drawing Sheets

INDUCTION SYSTEM FOR MARINE ENGINE

RELATED APPLICATION

This application claims priority to Japanese Patent Application No. 2001-265369, filed on Sep. 3, 2001, the entire contents of which are hereby incorporated by reference.

BACKGROUND OF THE INVENTION

1. Field of the Invention

The present invention relates to a marine engine. More particularly, preferred embodiments provide an improved air induction system for a marine engine that enables easy and smooth operation of a watercraft near a dock.

2. Description of the Related Art

Personal watercraft are designed to be relatively small and maneuverable, and are usually capable of carrying one to three riders. These craft commonly include a relatively small hull that defines a rider's area above an engine compartment. The rider's area normally includes a seat. A forward portion of the rider's area also normally includes a steering handle, which normally has an attached throttle lever.

The engine compartment contains an internal combustion engine that powers a jet propulsion unit. The engine includes an air induction system for delivering air into one or more combustion chambers. The engine also includes an exhaust system for expelling exhaust gases from the combustion chambers to the body of water in which the watercraft operates.

The jet propulsion unit, which includes an impeller, is positioned within a tunnel formed on an underside of the hull behind the engine compartment. An impeller shaft, which is driven by the engine, usually extends between the engine and the jet propulsion device through a bulkhead of the hull tunnel. Rotation of the impeller discharges water rearwardly of the watercraft through a steering nozzle, propelling the watercraft. The rider controls the speed of the watercraft by varying the rate of water discharge through the steering nozzle via the throttle lever.

A deflector within the steering nozzle controls a direction of water discharge from the steering nozzle, thus controlling a direction of travel of the watercraft. An orientation of the deflector corresponds to an orientation of the steering handle. Thus, to turn the watercraft, the rider turns the steering handle, which turns the deflector.

SUMMARY OF THE INVENTION

The preferred embodiments of the induction system for marine engine have several features, no single one of which is solely responsible for their desirable attributes. Without limiting the scope of this induction system as expressed by the claims that follow, its more prominent features will now be discussed briefly. After considering this discussion, and particularly after reading the section entitled "Detailed Description of the Preferred Embodiments," one will understand how the features of the preferred embodiments provide advantages, which include the ability to make fine adjustments of watercraft speed and direction at low engine speeds.

When docking the watercraft, smooth control and the ability to make fine adjustments in speed and direction are advantageous. However, in order to turn the watercraft, water must be discharged from the steering nozzle. Thus, the rider must carefully manipulate the steering handle and the throttle lever simultaneously to control the direction and speed of the watercraft. Such control is difficult at low engine speeds, such as when docking, because very little water is discharged through the steering nozzle. Thus, one aspect of the present induction system for marine engine comprises the realization that present watercraft engines do not provide the ability to make fine adjustments to speed and direction at low engine speeds.

A preferred embodiment of the induction system for personal watercraft comprises a watercraft including a hull defining an engine compartment. An internal combustion engine is disposed within the engine compartment. The engine includes an engine body defining at least one combustion chamber, and an air induction system. The air induction system includes an air intake chamber having an inlet, at least one throttle body having an inlet end in fluid communication with the air intake chamber and at least one throttle valve providing selective fluid communication between the inlet end and the at least one combustion chamber. The air induction system further includes an air intake bypass device providing selective fluid communication between the air intake chamber and the at least one throttle body at a point downstream from the at least one throttle valve in a direction of air flow from the air intake chamber to the at least one combustion chamber. Additionally, the bypass device is responsive to a user-operable switch, and adjusts an air amount delivered to the engine based on an output of the user-operable switch.

Another preferred embodiment of the induction system for personal watercraft comprises a watercraft including a hull defining an engine compartment. An internal combustion engine is disposed within the engine compartment. The engine includes an engine body defining at least one combustion chamber, and an air induction system. The air induction system includes an air intake chamber having an inlet, at least one throttle body having an inlet end in fluid communication with the air intake chamber and at least one throttle valve providing selective fluid communication between the inlet end and the at least one combustion chamber. The air induction system further includes an air intake bypass device configured to guide intake air to the at least one throttle body at a point downstream from the at least one throttle valve in a direction of air flow from the air intake chamber to the at least one combustion chamber. A sensor is configured to sense when the watercraft approaches a dock. The bypass device is configured to increase an amount of air delivered to the engine based on the output of the sensor.

Another preferred embodiment of the induction system for personal watercraft comprises a four-cycle internal combustion engine comprising an engine body defining at least one combustion chamber. The engine further comprises an air intake chamber, and an air induction passage having an inlet end disposed in an interior of the air intake chamber. The induction passage extends from the inlet end to the at least one combustion chamber. A throttle valve is disposed within the induction passage. The engine further comprises an intake air bypass device. The bypass device includes a valve body having an air inlet, and at least one outlet for each cylinder in the engine.

BRIEF DESCRIPTION OF THE DRAWINGS

The preferred embodiments of the induction system for personal watercraft, illustrating its features, will now be discussed in detail. Several of the internal components of the watercraft (e.g., the engine) are illustrated in phantom. The illustrated embodiments depict the novel and non-obvious induction system for personal watercraft shown in the accompanying drawings, which are for illustrative purposes only. These drawings include the following figures, in which like numerals indicate like parts.

DETAILED DESCRIPTION OF THE PREFERRED EMBODIMENTS

With reference to FIGS. 1–10, the following describes an overall configuration of a personal watercraft 11. The watercraft 11 is powered by an internal combustion engine 12, which operates on a four-stroke cycle combustion principle. An arrow F, present in several of the figures, indicates the watercraft's forward direction of travel.

Figure 1:
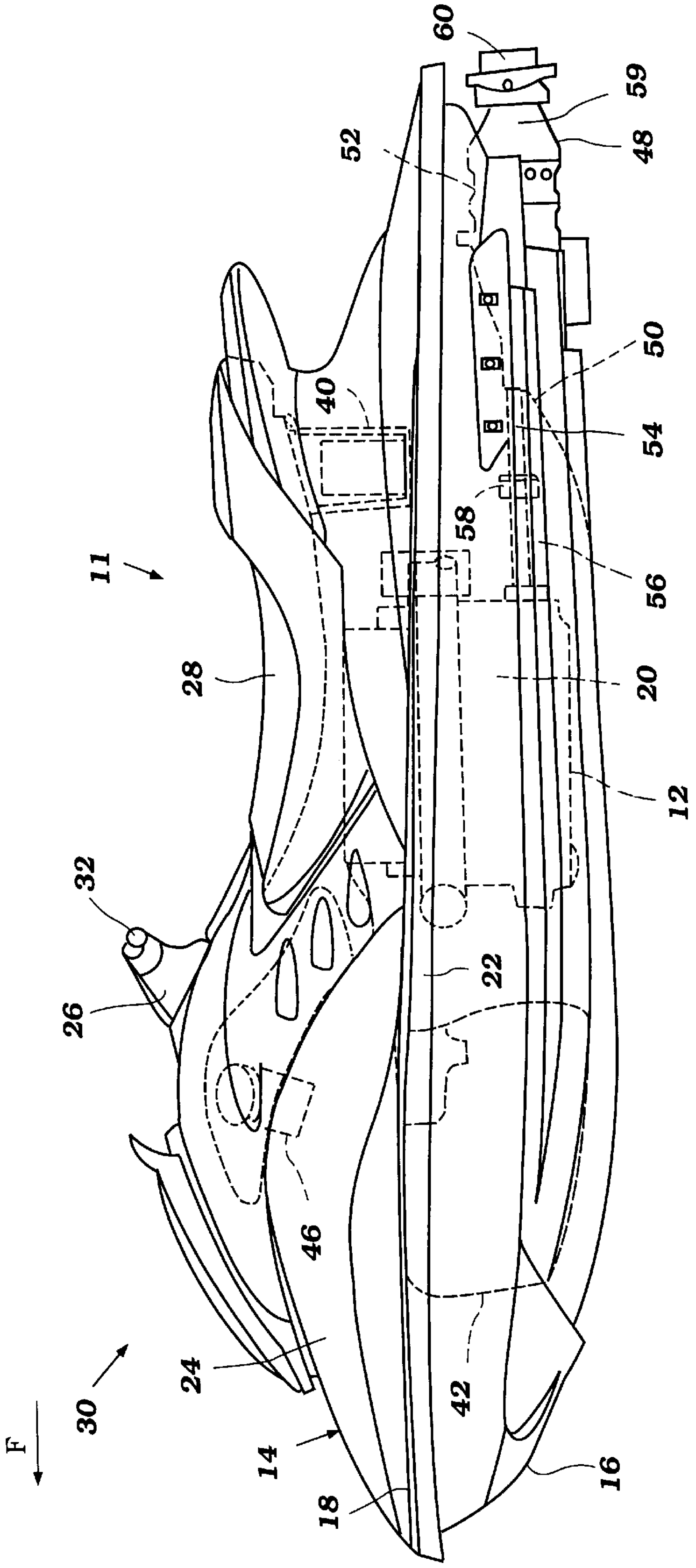
FIG. 1 is a left side elevation view of a personal watercraft of a type powered by a marine engine configured in accordance with a preferred embodiment of the present invention, certain internal components, such as an engine, are illustrated in phantom.
Figure 2:
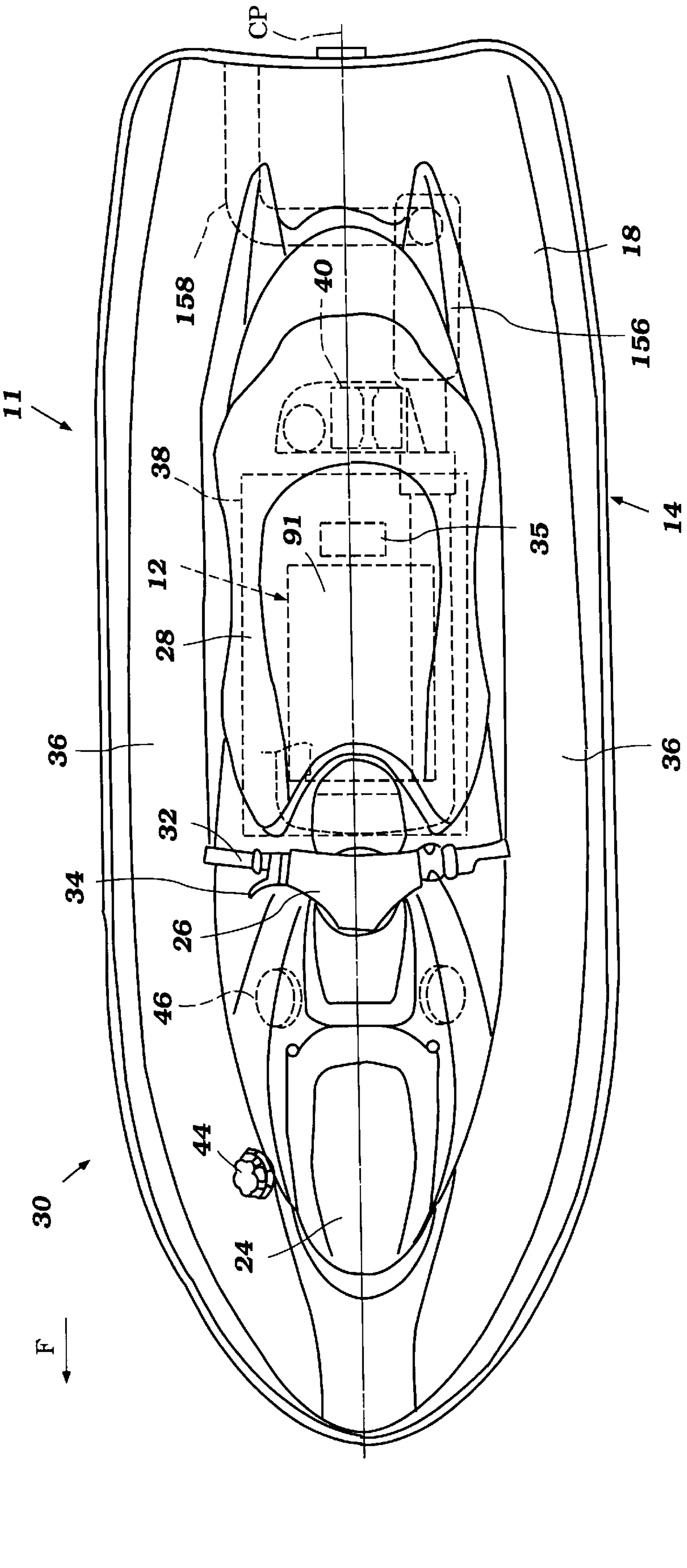
FIG. 2 is a top plan view of the watercraft of FIG. 1.

Referring to FIGS. 1 and 2, the personal watercraft 11 includes a hull 14 formed with a lower hull section 16 and an upper hull section or deck 18. Both hull sections 16, 18 may be constructed of, for example, a molded fiberglass-reinforced resin or a sheet molding compound. The hull sections 16, 18 may, however, be constructed from a variety of other materials selected to make the watercraft 11 lightweight and buoyant. The lower hull section 16 and the upper hull section 18 are coupled together and define an internal cavity 20 (FIG. 1). A bond flange 22 defines an intersection of the lower and upper hull sections 16, 18, as well as a portion of a gunwale extending around a portion of the periphery of the hull 14.

A center plane CP (FIG. 2) extends through the hull 14, generally vertically from bow to stern. Along the center plane CP, the upper hull section 18 includes a hatch cover 24, a control mast 26 and a seat 28 arranged from fore to aft. In the illustrated embodiment, a bow portion 30 of the upper hull section 18 slopes upwardly (FIG. 1). An opening (not shown) in the bow portion 30 provides access to the internal cavity 20. The hatch cover 24 is detachably affixed (e.g., hinged) to the bow portion 30 so as to cover the opening.

The control mast 26 extends upwardly and supports a handle bar 32. Primarily, the handle bar 32 controls the direction of travel of the watercraft 11. Grips at either end of the bar 32 aid the rider in controlling the direction of travel, and in maintaining his or her balance upon the watercraft 11. The handle bar 32 also carries other control units such as, for example, a throttle lever 34 that controls running conditions of the engine 12. Additionally, the handle bar 32 can include a user-operable switch (not shown) that is connected to the engine 12 so as to trigger a maneuvering thrust, discussed in greater detail below.

A jet pump unit 48 (FIG. 1) propels the watercraft 11. The jet pump unit 48 is mounted at least partially in a tunnel 50 formed on the underside of the lower hull section 16. The tunnel 50 is preferably isolated from the engine compartment by a bulkhead (not shown). The tunnel 50 has a downward facing inlet port (not shown) opening toward the body of water. A jet pump housing 52 is disposed within a portion of the tunnel 50 and communicates with the inlet port. An impeller (not shown) is supported within the housing 52.

An impeller shaft 54 extends forwardly from the impeller. A coupling member 58 couples the impeller shaft 54 to a crankshaft 56. The engine 12 rotates the crankshaft 56, as described below. The crankshaft 56 thus drives the impeller shaft 54, causing the impeller to rotate.

The rear end of the housing 52 defines a discharge nozzle 59. The discharge nozzle 59 includes a steering nozzle 60, which a rider uses to control a direction of travel of the watercraft 11. A cable (not shown) connects the steering nozzle 60 to the handle bar 32 so that the rider can pivot the nozzle 60 by rotating the handle bar 32.

The seat 28 extends along the center plane CP to the rear of the bow portion 30. The seat 28 also generally defines a rider's area. The seat 28 has a saddle shape, enabling a rider to sit on the seat 28 in a straddle-type fashion. Foot areas 36 (FIG. 2) are defined on both sides of the seat 28 on the top surface of the upper hull section 18. The foot areas 36 are preferably generally flat.

The seat 28 comprises a cushion detachably supported, at least in principal part, by the upper hull section 18. An opening 38 (FIG. 2) under the seat 28 allows access to the internal cavity 20 when the seat 28 is removed. In the illustrated embodiment, the upper hull section 18 also defines a storage box 40 under the seat 28.

A fuel tank 42 (FIG. 1) occupies a portion of the cavity 20 under the bow portion 30 of the upper hull section 18. A duct (not shown) connects the fuel tank 42 to a fuel inlet port positioned at a top surface of the upper hull section 18. A cap 44 (FIG. 2) seals the fuel inlet port. Optionally, the cap 44 can be positioned under the hatch cover 24.

The engine 12 is configured in accordance with preferred embodiments of the present induction system. The configurations of the preferred embodiments of the engine 12 have particular utility in combination with a personal watercraft, such as the personal watercraft 11. Thus, the following describes preferred embodiments of the engine 12 in the context of the personal watercraft 11. These engine configurations, however, can be applied to other types of watercraft as well, such as, for example, small jet boats.

The engine 12 occupies an engine compartment within the cavity 20. The engine compartment is preferably located under the seat 28, but other locations are also possible (e.g., beneath the control mast 26 or in the bow 30). The rider thus accesses the engine 12 in the illustrated embodiment through the access opening 38 (FIG. 2) by detaching the seat 28.

The engine compartment 20 is preferably substantially sealed so as to prevent water from entering, which could damage the engine 12 or other components. However, a pair of air ducts or ventilation ducts 46 ventilate the engine compartment. The ventilation ducts 46 are provided on both sides of the bow 30, as shown in FIG. 2. The watercraft 11 may also include additional air ducts (not shown) in a rear area of the internal cavity 20. Ambient air enters and exits the internal cavity 20 through the ducts 46, and travels to the engine 12 where it is used in the combustion reaction that powers the watercraft 11, as described below.

Figure 3:
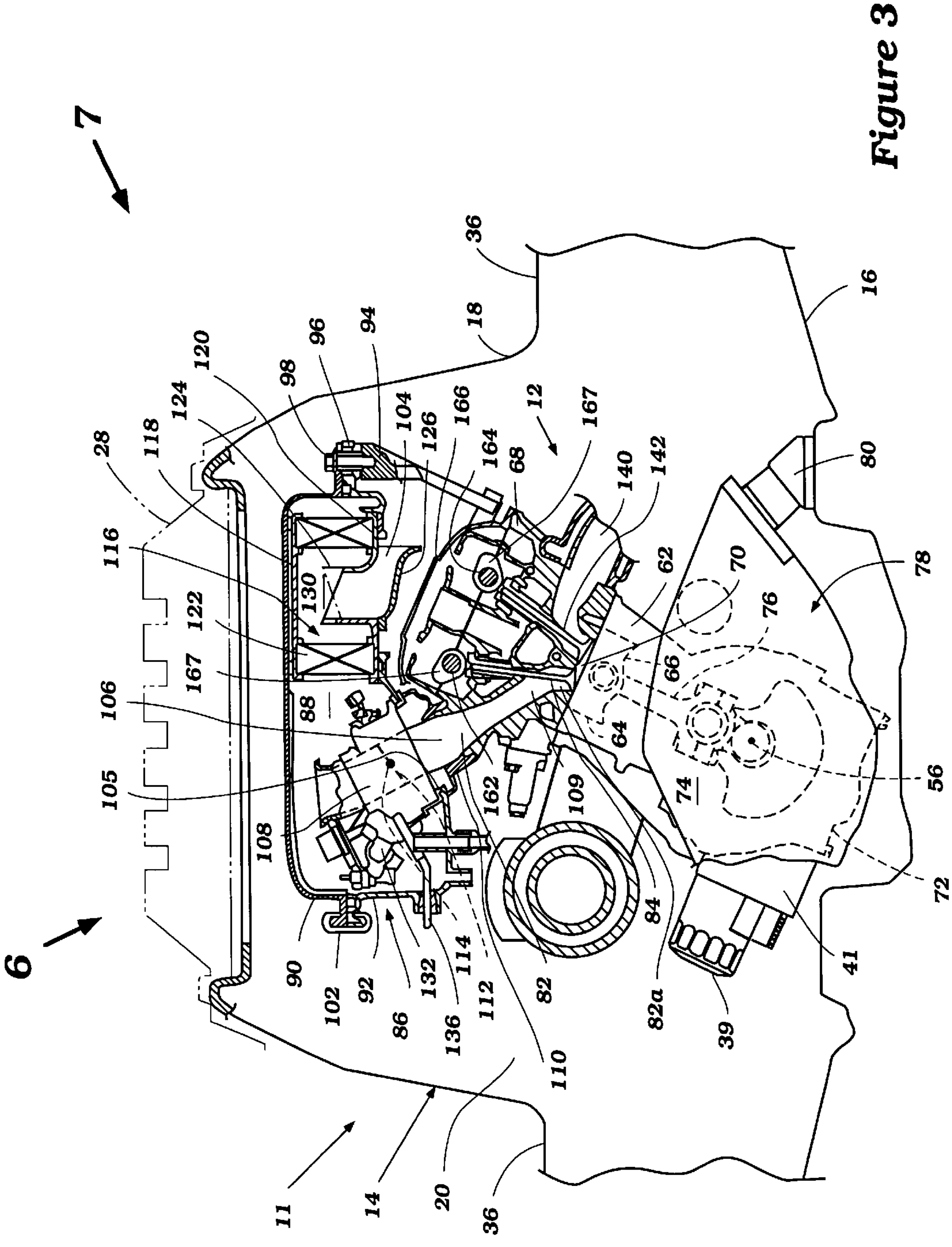
FIG. 3 is a schematic and partial cross-sectional rear view of the watercraft and engine of FIG. 1, including an air intake box, a schematic profile of a hull of the watercraft, and an opening of an engine compartment of the hull.
Figure 4:
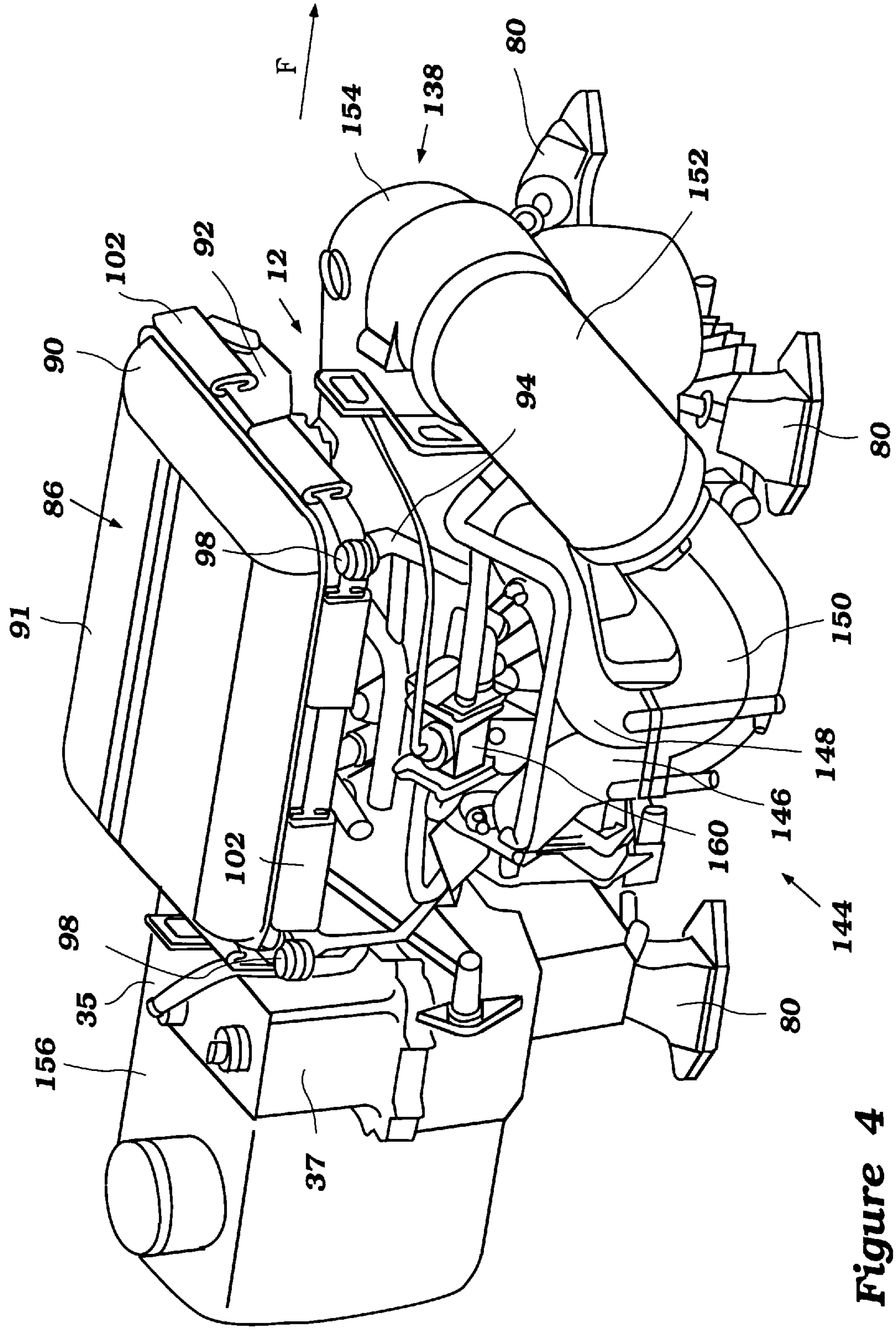
FIG. 4 is a front, top, and starboard side perspective view of the engine of FIG. 3.
Figure 5:
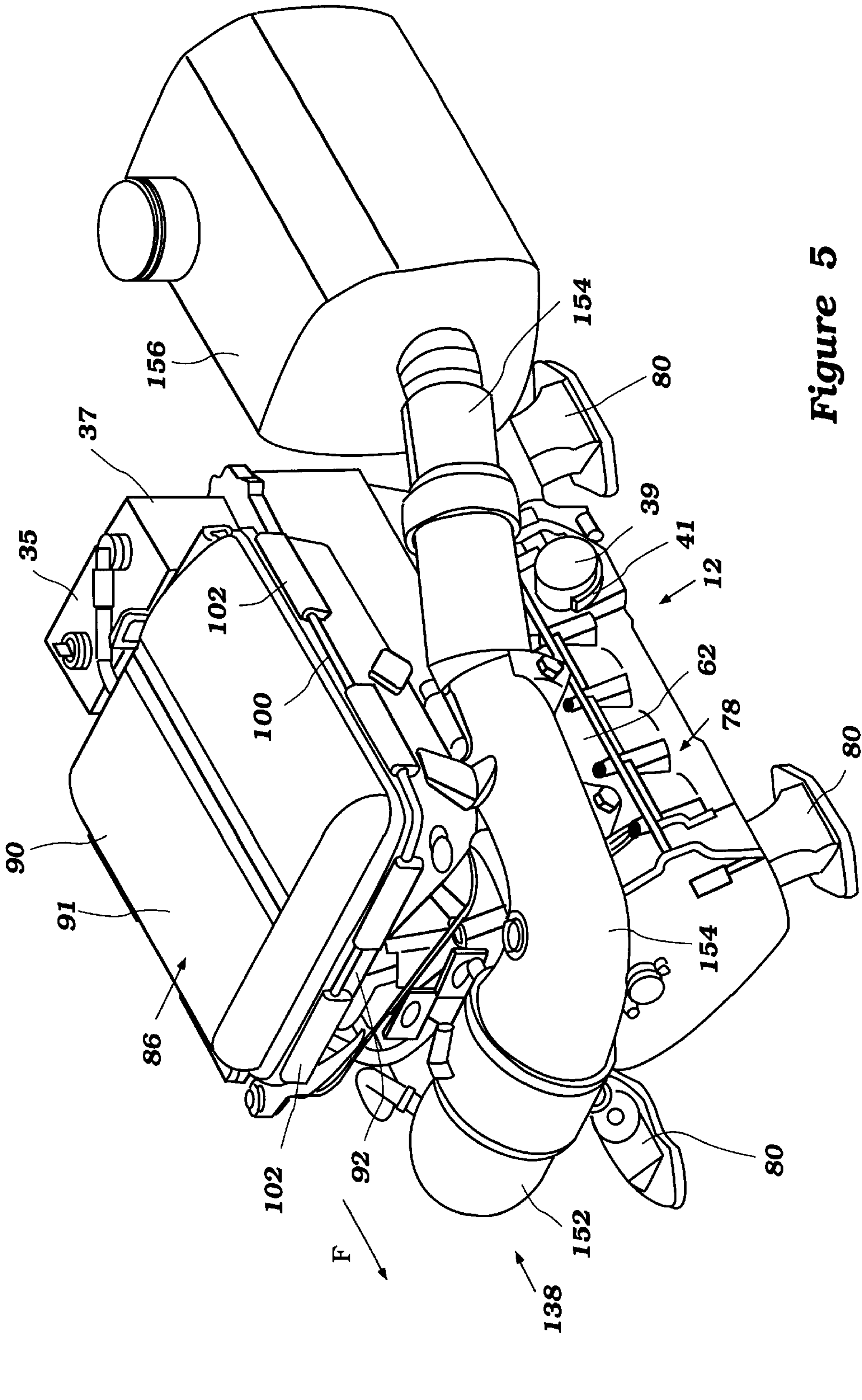
FIG. 5 is a front, top, and port side perspective view of the engine of FIG. 3.

With reference to FIGS. 3–5, the engine 12 includes a cylinder block 62. The cylinder block 62 defines four cylinder bores 64 which are spaced from each other in a fore to aft direction along the center plane CP. The engine 12 is thus described as an L4 (in-line four cylinder) type. The illustrated engine 12, however, merely exemplifies one type of engine that may include preferred embodiments of the present induction system. Engines having other numbers of cylinders, having other cylinder arrangements, other cylinder orientations (e.g., upright cylinder banks, V-type, and W-type) and operating on other combustion principles (e.g., crankcase compression two-stroke, diesel, and rotary) are all practicable.

Each cylinder bore 64 has a center axis CA (FIG. 3) that is oriented at an angle relative to the center plane CP to shorten the engine's 12 height. All the center axes CA in the illustrated embodiment are inclined at the same angle. Pistons 66 reciprocate within the cylinder bores 64. A cylinder head 68 is affixed to the upper end of the cylinder block 62. The cylinder head 68 closes the upper ends of the cylinder bores 64 and defines combustion chambers 70 along with the cylinder bores 64 and the pistons 66.

A crankcase 72 is affixed to the lower end of the cylinder block 62. The crankcase closes the respective lower ends of the cylinder bores 64 and defines a crankcase chamber 74. A crankshaft 56 is retractably connected to the pistons 66 through connecting rods 76 and is journaled with the crankcase 72. That is, the connecting rods 76 are rotatably coupled with the pistons 66 and with the crankshaft 56.

The cylinder block 62, the cylinder head 68, and the crankcase 72 together define an engine body 78. The engine body 78 is preferably made of an aluminum based alloy. In the illustrated embodiment, the engine body 78 is oriented in the engine compartment 20 so as to position the crankshaft 56 generally parallel to the central plane CP. Other orientations of the engine body, of course, are also possible (e.g., with a transverse or vertical crankshaft).

Engine mounts 80 extend from both sides of the engine body 78. In FIG. 3, the port side engine mounts have been omitted to more clearly illustrate the oil filter assembly. The engine mounts 80 preferably include resilient portions made of, for example, a rubber material to attenuate vibrations from the engine 12. The engine 12 is preferably mounted on a hull liner that forms a part of the lower hull section 16.

The engine 12 is lubricated with oil housed in an oil tank 37 (FIGS. 4 and 5) mounted aft of the engine 12. Oil from the tank 37 circulates throughout the engine 12 when the engine 12 is operating. A circulation path of the oil passes through an oil filter 39 (FIGS. 3 & 5) that is mounted to a side of the engine 12. The oil filter 39 removes contaminants from the oil that could harm the engine 12. An oil dish 41 mounted to the engine 12 just beneath the oil filter 39 captures dripping oil when the oil filter 39 is removed from the engine 12.

The engine 12 preferably includes an air induction system to introduce air into the combustion chambers 70. In the illustrated embodiment, the air induction system includes air intake ports 82, 82*a* (FIG. 3) defined in the cylinder head 68. At least two air intake ports 82, 82*a* communicate with each combustion chamber 70. A first air intake port 82 is located in a first portion of the cylinder head 68 remote from the combustion chamber 70. A second air intake port 82*a* is located in a second portion of the cylinder head 68 adjacent the entrance to the combustion chamber 70. Depending upon the engine configuration, the second air intake ports 82*a* may branch into multiple ports 82*a*. Intake valves 84 selectively open and close the intake ports 82*a*, thereby selectively connecting and disconnecting the intake ports 82, 82*a* with the combustion chambers 70.

The air induction system also includes an air intake box 86 (FIGS. 3–5), which defines a plenum chamber 88 (FIG. 3) within. The air intake box 86 smoothes intake air and acts as an intake silencer. The intake box 86 in the illustrated embodiment has a generally rectangular shape in top plan view. The intake box 86 could, of course, embody other shapes, but preferably the plenum chamber 88 is as large as possible within the available space in the engine compartment 20. In the illustrated embodiment, a space is defined between the top of the engine 12 and the bottom of the seat 28 due to the inclined orientation of the engine 12. The rectangular shape of the intake box 86 conforms to this space.

With reference to FIGS. 3–5, the intake box 86 comprises an upper chamber member 90 and a lower chamber member 92. The upper and lower chamber members 90, 92 preferably are made of plastic or synthetic resin, although they can be made of metal or other material. Additionally, the intake box 86 can be formed by a different number of members and/or can have a different assembly orientation (e.g., side-by-side).

With reference to FIG. 3, the lower chamber member 92 is preferably coupled with the engine body 78. In the illustrated embodiment, several stays 94 (FIGS. 3 and 4) extend upwardly from the engine body 78 and a flange portion 96 of the lower chamber member 92 extends generally horizontally. Several fastening members, for example, bolts 98 and nuts (not shown), connect the flange portion 96 to respective top surfaces of the stays 94. The upper chamber member 90 has a flange portion 100 (FIG. 5) that abuts the flange portion 96 of the lower chamber member 92. Several coupling or fastening members 102 (FIGS. 3–5), which are generally configured as a shape of the letter "C" in section, preferably engage both the flange portions 96, 100 so as to couple the upper chamber member 90 with the lower chamber member 92.

Figure 6:
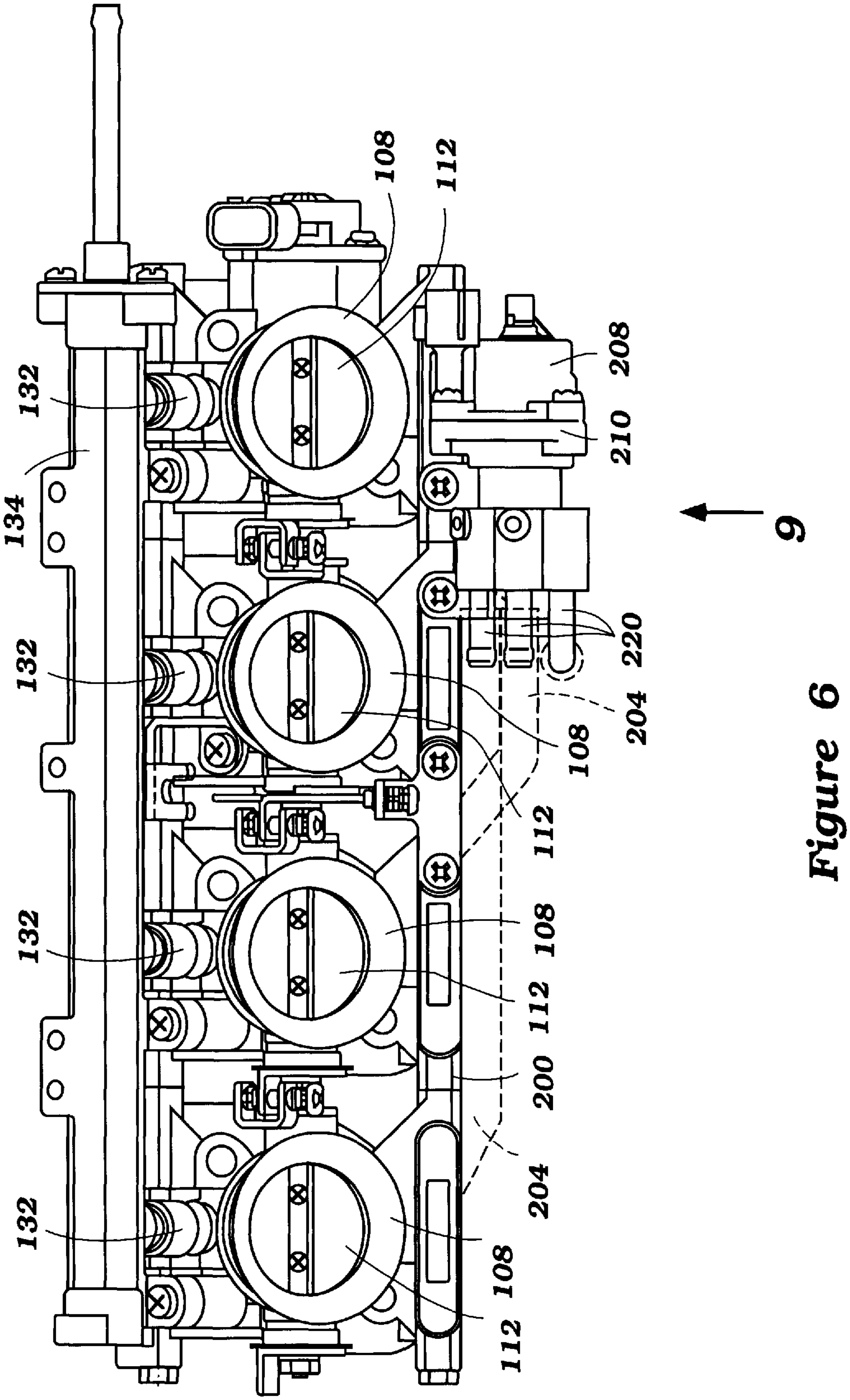
FIG. 6 is a top view of a portion of the engine of FIG. 3, taken in the direction of the arrow 6 in FIG. 3, illustrating the throttle bodies, throttle valves, and air intake bypass device.
Figure 7:
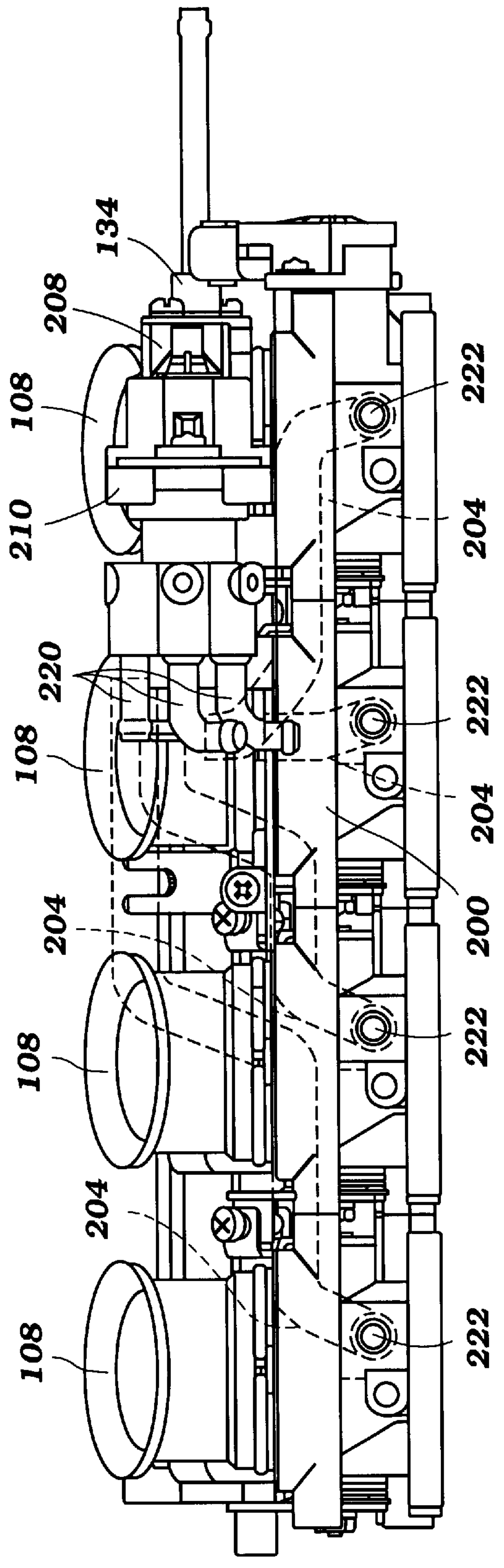
FIG. 7 is a side view of a portion of the engine of FIG. 3, taken in the direction of the arrow 7 in FIG. 3, illustrating the throttle bodies, throttle valves, and air intake bypass device.
Figure 8:
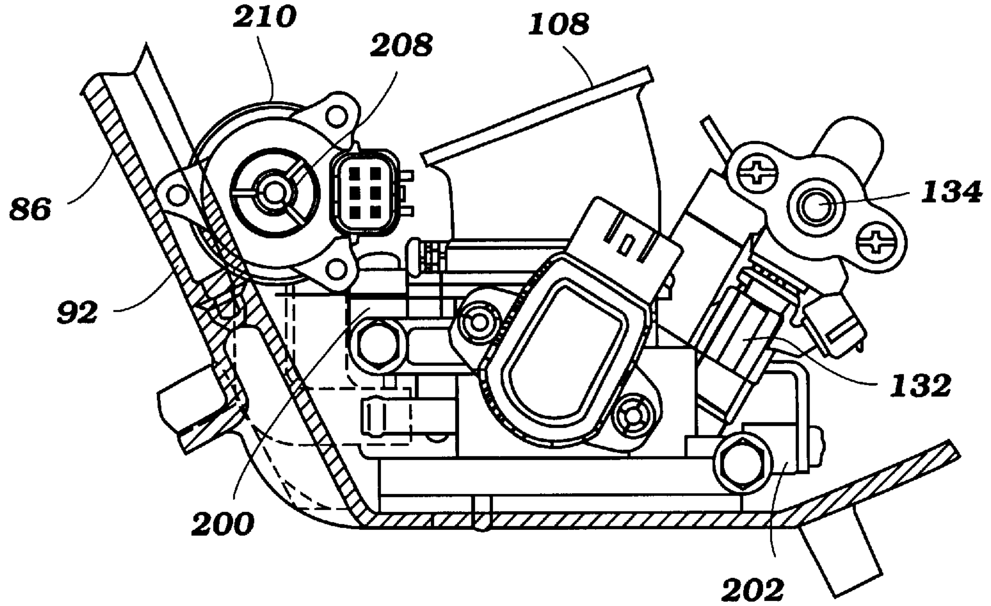
FIG. 8 is a schematic and partial cross-sectional rear view of a portion of the engine of FIG. 3, illustrating the throttle bodies, and air intake bypass device.

With reference to FIG. 3, the lower chamber member 92 defines an inlet opening 104 and, preferably, four outlet apertures 105. Four throttle bodies 108 extend through the apertures 105. Preferably the throttle bodies 108 are fixed to each other via a pair of rails 200, 202 (FIGS. 6–8). Respective bottom ends of the throttle bodies 108 are coupled with the associated intake ports 82. Preferably, as illustrated in FIG. 3, the outlets of bottom ends of the throttle bodies 108 are spaced from the apertures 105. Thus, the lower chamber member 92 is spaced from the engine 12, thereby attenuating heat transfer from the engine body 78 to the intake box 86.

With reference to FIG. 3, the throttle bodies 108 slant toward the port side of the watercraft 11, away from the center axis CA of the cylinder bores 64. A sleeve 110 extends between the lower chamber member 92 and the cylinder head 68 and generally surrounds a portion of the throttle bodies 108. Respective top ends of the throttle bodies 108, in turn, open upwardly within the plenum chamber 88. Air in the plenum chamber 88 is thus drawn to the combustion chambers 70 when negative pressure is generated in the combustion chambers 70. Negative pressure is generated when the pistons 66 move toward the bottom dead center from the top dead center. The air travels through an inlet passage 109, which in part comprises the throttle bodies 108 and the intake ports 82, 82*a*.

Each throttle body 108 includes a butterfly-type throttle valve 112 (FIG. 3). A throttle valve shaft 114, journaled for pivotal movement, links the throttle valves 112. The throttle lever 34 on the handle bar 32 (FIG. 2) controls pivotal movement of the throttle valve shaft 114 through a control cable that is connected to the throttle valve shaft 114. The rider thus controls the opening and closing of the throttle valves 112 by operating the throttle lever 32. The degree to which the throttle valves 112 are open determines the amount of air that passes through the throttle bodies 108 and into the respective combustion chambers 70. The amount of air entering the combustion chambers determines the running condition of the engine 12. More air generates higher power output and thus higher revolutions per minute (rpm), less air generates less power and thus lower rpm.

With reference to FIG. 3, the air inlet port 104 introduces air into the plenum chamber 88. In the illustrated embodiment, a filter assembly 116 surrounds the inlet port 104. The filter assembly 116 comprises an upper plate 118, a lower plate 120 and a filter element 122 interposed between the upper and lower plates 118, 120. Preferably, the filter element 122 comprises oil resistant and water-repellent elements. The filter assembly 116, including the lower plate 120, has a generally rectangular shape in top plan view. The filter element 122 extends along a periphery of the rectangular shape so as to define a gap between a peripheral edge of the filter element 122 and an inner wall of the air box 86.

The lower plate 120 includes a duct 124, which extends inwardly toward the plenum chamber 88. The duct 124 is positioned generally above the cylinder head 68. In the illustrated embodiment, an upper end of the duct 124 slants away from the throttle bodies 108. This orientation advantageously draws water or water mist, if any, away from the throttle bodies 108. Those of skill in the art will appreciate, however, that the ducts 124 may slant toward the throttle bodies 108, as shown in dashed lines in FIG. 3. This orientation creates a smooth air flow through the plenum chamber 88. Alternatively, the upper ends of the ducts 124 may be arranged so that some slant away from the throttle bodies 108 and the rest slant toward the throttle bodies 108.

In the illustrated embodiment, a guide member 126 is affixed to the lower plate 120 immediately below the duct 124. The guide member 126 partially defines the inlet opening 104 and orients the inlet opening 104 toward the starboard side of the watercraft 11. Air traveling from the engine compartment 20 into the plenum chamber 88 travels through the inlet opening 104 to an interior volume 130 defined by the filter element 122. The air in this volume 130 must pass through the filter element 122 in order to reach the throttle bodies 108. The filter element 122 removes foreign substances from the air as the air passes.

Because the air inlet openings 104 are formed at the bottom of the intake box 86, water and/or other foreign substances are unlikely to enter the plenum chamber 88. The filter element 122 provides a further barrier to the entry of water and foreign particles into the throttle bodies 108. In addition, part of the openings 104 are defined by the ducts 124 extending into the plenum chamber 88. Thus, a desirable length for efficient silencing of intake noise is accommodated within the plenum chamber 88.

The engine 12 also includes a fuel supply system as illustrated in FIGS. 1, 3, 6 and 7. The fuel supply system includes the fuel tank 42 (FIG. 1) and fuel injectors 132 that are affixed to a fuel rail 134 (FIGS. 6–8) and are mounted on the throttle bodies 108. Each fuel injector 132 has an injection nozzle directed toward the intake port 82 associated with each fuel injector 132. The fuel rail 134 extends generally horizontally in the longitudinal direction. A fuel inlet port 136 (FIG. 3) passes through a side wall of the lower chamber member 92 and couples the fuel rail 134 with an external fuel passage. Because the throttle bodies 108 are disposed within the plenum chamber 88, the fuel injectors 132 are also desirably positioned within the plenum chamber 88. However, other types of fuel injectors may be used which are not mounted in the intake box 86, such as, for example, direct fuel injectors and induction passage fuel injectors connected to the scavenge passages of two-cycle engines.

When the intake valves 84 open, air from the plenum chamber 88 is drawn through the intake ports 82 and into the combustion chambers 70. At the same time, the fuel injectors 132 deliver a predetermined amount of fuel spray, which also travels through the intake ports and into the combustion chambers 70. The pistons 66 compress the air-fuel mixture within their respective cylinder bores 64, and the spark plugs ignite the compressed mixture. The resulting combustion reaction generates the power that propels the watercraft 11.

With reference to FIGS. 3–5, the engine 12 further includes an exhaust system 138 that discharges the combustion by-products, i.e., exhaust gases, from the combustion chambers 70. In the illustrated embodiment, the cylinder head 68 includes a plurality of exhaust ports 140 (FIG. 3), at least one for each combustion chamber 70. Exhaust valves 142 selectively connect and disconnect the exhaust ports 140 with the combustion chambers 70.

The exhaust system 138 further includes an exhaust manifold 144 (FIG. 4). In a presently preferred embodiment, the manifold 144 comprises a first manifold 146 and a second manifold 148 coupled with the exhaust ports 140. The first and second manifolds 146, 148 receive exhaust gases from the respective ports 140. The first manifold 146 is connected to two of the exhaust ports 140 and the second manifold 148 is connected with the two remaining exhaust ports 140. In a presently preferred embodiment, the first and second manifolds 146, 148 are configured to nest with each other.

Respective downstream ends of the first and second exhaust manifolds 146, 148 are coupled with a first unitary exhaust conduit 150. As shown in FIGS. 4 and 5, the first unitary conduit 150 further couples with a second unitary exhaust conduit 152. The second unitary conduit 152 further couples with an exhaust pipe 154 on the rear side of the engine body 78.

With reference to FIG. 5, the exhaust pipe 154 extends along a side surface of the engine body 78 on the port side of the watercraft 11. The exhaust pipe 154 connects to a forward surface of a water-lock 156. With reference to FIG. 2, a discharge pipe 158 extends from a top surface of the water-lock 156, and runs transverse to the watercraft 11 across the center plane CP. The discharge pipe 158 then extends rearwardly and opens at a stem of the lower hull section 16. Preferably, when the watercraft is in use the discharge pipe is submerged beneath a body of water on which the watercraft floats. The water-lock 156 prevents water in the discharge pipe 158 from entering the exhaust pipe 154.

With reference to FIG. 4, the engine 12 preferably includes a secondary air supply system 160 that supplies air from the air induction system to the exhaust system 138. More specifically, for example, oxygen ($O_2$) that is supplied to the exhaust system 138 from the air induction system removes hydro carbon (HC) and carbon monoxide (CO) components of the exhaust gases through an oxidation reaction.

With reference to FIG. 3, a valve cam mechanism within the engine 12 actuates the intake and exhaust valves 84, 142. The illustrated embodiment employs a double overhead camshaft drive. That is, an intake camshaft 162 actuates the intake valves 84 and an exhaust camshaft 164 separately actuates the exhaust valves 142. The intake camshaft 162 extends generally horizontally over the intake valves 84 from fore to aft generally parallel to the center plane CP, and the exhaust camshaft 164 extends generally horizontally over the exhaust valves 142 from fore to aft, also generally parallel to the center plane CP.

Both the intake and exhaust camshafts 162, 164 are journaled by the cylinder head 68 with a plurality of camshaft caps (not shown). A cylinder head cover 166 (FIG. 3) extends over the camshafts 162, 164 and the camshaft caps. The, cylinder head cover 166, which is affixed to the cylinder head 68, defines a camshaft chamber. The stays 94 and the secondary air supply device 160 are preferably affixed to the cylinder head cover 166. Additionally, the secondary air supply device 160 is preferably disposed between the intake air box 86 and the engine body 78.

The intake camshaft 162 has cam lobes 167, each associated with a respective intake valve 84. The exhaust camshaft 164 also has cam lobes 167 associated with respective exhaust valves 142. Springs (not shown) bias the intake and exhaust valves 84, 142 to close the intake and exhaust ports 82*a*, 140. When the intake and exhaust camshafts 162, 164 rotate, the cam lobes 167 push the respective valves 84, 142 to open the respective ports 82*a*, 142 by overcoming the biasing forces of the springs. The air thus enters the combustion chambers 70 when the intake valves 84 open, and the exhaust gases exit the combustion chambers 70 when the exhaust valves 142 open.

Preferably, the crankshaft 56 drives the intake and exhaust camshafts 162, 164. Accordingly, an end of each camshaft 162, 164, includes a driven sprocket (not shown), and an end of the crankshaft 56 includes a drive sprocket (not shown). A diameter of each driven sprocket is twice as large as a diameter of the drive sprocket. Preferably, a timing chain or belt (not shown) is wound around the drive and driven sprockets. When the crankshaft 56 rotates, the timing chain drives the drive sprocket, which drives the driven sprockets and rotates the intake and exhaust camshafts 162, 164. The rotation speeds of the camshafts 162, 164 are half of the rotation speed of the crankshaft 56, due to the ratio of the diameters of the drive and driven sprockets.

When the watercraft 11 is operating, ambient air enters the internal cavity 20 defined in the hull 34 through the air ducts 46 (FIGS. 1 and 2). The air then enters the plenum chamber 88, defined by the intake box 86, through the air inlet ports 104 and travels into the throttle bodies 108 (FIGS. 3, 6 and 7). The majority of the air in the plenum chamber 88 flows to the combustion chambers 70. The throttle valves 112 in the throttle bodies 108 regulate the amount of air that passes into the combustion chambers 70. With the throttle lever 58, the rider controls the opening angles of the throttle valves 112, and thus the amount of air that flows past the valves. The air flowing past the throttle valves 112 flows into the combustion chambers 70 when the intake valves 84 open. At the same time that the intake valves open, the fuel injectors 132 spray fuel into the intake ports 82 at the direction of an electronic control unit (ECU).

The pistons 66 compress the air/fuel mixture in the combustion chambers 70, and then the spark plugs (not shown) ignite the compressed mixtures under the control of the ECU. The exhaust system 138 discharges the exhaust gases from the combustion explosions to the body of water surrounding the watercraft 11. The secondary air supply system 160 delivers a relatively small amount of air from the plenum chamber 88 to the exhaust system 138. This secondary air aids in combusting any unoxidized fuel remaining in the exhaust gases.

The force generated by the combustion explosions reciprocates the pistons 66. The reciprocating pistons 66 rotate the crankshaft 56. The rotating crankshaft 56 drives the impeller shaft 54, and the impeller rotates in the hull tunnel 50. The rotating impeller draws water into the tunnel 50 through the inlet port and discharges it rearward through the discharge nozzle 59 and through the steering nozzle 60. The rider controls the direction in which the nozzle 60 discharges water by manipulating the steering handle bar 32. The watercraft 11 thus moves according to the rider's direction.

When docking the watercraft 11, the rider moves the watercraft 11 at a slow speed in a highly controlled manner so as to avoid colliding with the dock. Even minor bumps against the hard dock can cause significant cosmetic and structural damage to the watercraft hull 14. To maintain a low speed, the rider applies little or no pressure to the throttle lever 34 in order to keep the engine 12 running at or just slightly above idle speed. However, the throttle lever 34 generally has only a small amount of travel. Additionally, butterfly-type valves that are commonly used as throttle valves provide limited proportionality at small throttle openings. Thus, even slight pressure on the throttle lever 34 can generate a significant increase in engine speed. As a result, riders can have difficulty making fine adjustments to engine speed, when the engine is operating at low speeds, such as idle.

Water discharged from the steering nozzle 60 controls a direction of travel of the watercraft 11. When docking, however, the steering nozzle 60 discharges very little water because the engine 12 is running at slow speed. In addition, personal watercraft powered by four-cycle engines preferably include a gear reduction such that the impeller spins at lower rpm than the engine. This allows the engine to operate at higher speeds, and thus produce higher output per liter of displacement. However, the gear reduction further decreases the volume of water that the steering nozzle 60 discharges at low engine speeds, and in particular, at the lowest engine speed, i.e., idle. Consequently, docking and other maneuvers performed during idle engine speed and minimum watercraft speed, can be difficult.

The present induction system enhances the rider's ability to control the watercraft 11 and make fine adjustments in watercraft direction and speed at low engine rpm. A portion of the induction system is illustrated schematically in FIG. 10. The induction system, described in detail above, comprises a plurality of inlet passages 106 that conduct air through the throttle bodies 108, past the intake ports 82, and into the combustion chambers 70 within the engine 12. An inlet end of each inlet passage 106 is disposed within the air intake box 86. An outlet end of each inlet passage 106 is disposed within the cylinder head 68. By adjusting pressure on the throttle lever 34 (FIG. 2), the rider controls the opening and closing of the throttle valves 112 within the throttle bodies 108. The throttle valves 112 regulate an amount of air passing from the intake box 86 into the cylinder head 68. When the throttle valves 112 are closed, very little air passes into the combustion chambers 70 and the engine runs at a low speed, i.e., idle speed. As the throttle valves 112 open, more air passes into the combustion chambers 70 and the engine speed increases.

The induction system further comprises a bypass intake passage 204. A bypass valve 206, which is actuated by a stepper motor 208, controls opening and closing of the bypass intake passage 204. An inlet of the bypass intake passage 204 is disposed within the air box 86. Separate outlets of the bypass intake passage 204 are in fluid communication with each of the throttle bodies 108 at a point downstream of the throttle valves 112. When the bypass valve 206 is closed, air enters the throttle bodies 108 only through the throttle valves 112. When the stepper motor 208 opens the bypass valve 206, an additional volume of air enters the throttle bodies 108 through the bypass intake passage 204.

Normally, the bypass valve 206 is closed. However, the stepper motor 208 opens the bypass valve 206 when the watercraft 11 nears the dock. The stepper motor 208 may be activated automatically, for example, by sensors (not shown) that detect when the watercraft 11 nears a dock. Alternatively, the rider can activate a user-operable switch, for example, but without limitation, a button or a switch (not shown) which activates the stepper motor 208.

When the stepper motor 208 opens the bypass valve 206, the additional air flow into the combustion chambers 70 increases the speed of the engine. The increased engine speed causes the rotation speed of the impeller to increase. The increased impeller rotation speed generates greater thrust for the watercraft 11. The increased thrust enables the rider to more easily maneuver the watercraft 11. Since the bypass valve is driven by the stepper motor 208, the user-operable switch can be configured to allow the user to issue proportional control commands to the stepper motor 208, thus producing proportional control of engine speed.

Figure 9:
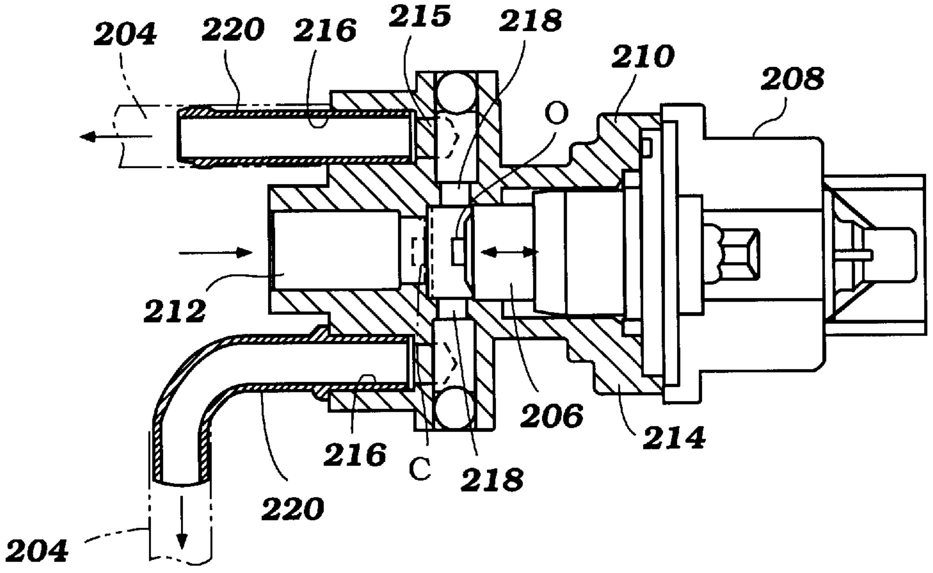
FIG. 9 is a partial cross-sectional view of the air intake bypass device of the engine of FIG. 3, taken in the direction of the arrow 9 in FIG. 3.
Figure 10:
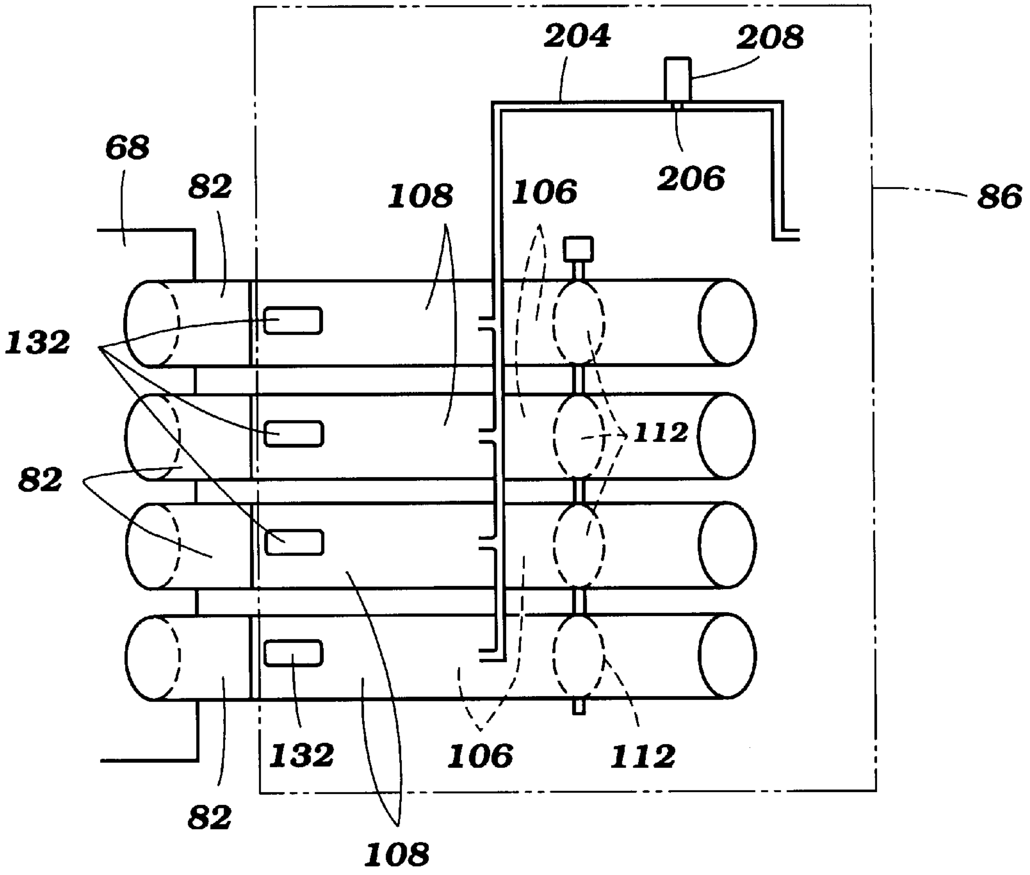
FIG. 10 is a schematic illustration of the components of the present induction system for marine engine, including the air intake box, cylinder head, inlet passages, and air intake bypass device.

With reference to FIGS. 6–9, the stepper motor 208 and the bypass valve 206 comprise a portion of an air intake bypass device 210. The bypass device 210 is secured to the rail 200 within the air intake box 86. Because the bypass device 210 is located within the air intake box 86, it is advantageously not exposed to water, which could interfere with proper functioning of electrical components of the bypass device 210. As illustrated in FIG. 9, the bypass device 210 comprises an air inlet 212 in a center part of a main body 214. The air inlet 212 is located at a first end of a cylindrical chamber 215 within the main body 214, and is in fluid communication with the air intake box 86. The main body 214 includes four outlets 216 (only two of which are visible in FIG. 9) that are in selective fluid communication with the inlet 212 through a bypass gate 218.

The bypass gate 218 comprises a plurality of holes in a side wall of the cylindrical chamber 215. Each of the holes is located at substantially the same point along a longitudinal axis of the cylindrical chamber 215. The bypass valve 206, which is substantially cylindrical, opens and closes the bypass gate 218 by moving forward and backward within the chamber 215 at the direction of the stepper motor 208.

Those of skill in the art will appreciate that alternative valve actuators, such as a solenoid, may be used instead of the stepper motor 208.

FIG. 9 illustrates the bypass valve 206 in the open position O. The valve 206 is located proximate the stepper motor 59, such that the valve does not cover the bypass gate 218. The outlets 216 are thus in fluid communication with the inlet 212 through the bypass gate 218. In dashed lines, FIG. 9 also illustrates the bypass valve 206 in the closed position C. The valve 206 is located distant from the stepper motor 59, such that an end of the valve 206 covers the inlet 212 and a side of the valve 206 covers the bypass gate 218. In this position, the valve blocks fluid communication between the inlet 212 and the outlets 216.

A connection adapter 220, comprising a substantially cylindrical nipple, is secured within each outlet 216. Each bypass intake passage 204 is connected at a first end to a connection adapter 220 (FIG. 9) and at a second end to another connection adapter 222 (FIG. 7) in fluid communication with a throttle body 108 downstream from the respective throttle valve 112.

Normally, the bypass valve 206 is in the closed position C (FIG. 9), such that all air entering the combustion chambers 70 passes through the throttle valves 112. When the watercraft 11 arrives at a dock, the stepper motor 208 moves the bypass valve 206 to the open position O. The stepper motor 208 may be activated manually or automatically, as described above. With the bypass valve 206 in the open position O, negative pressure within the combustion chambers 70 draws air into the air intake bypass device 210 through the inlet 212. The air travels through the cylindrical chamber 215, past the bypass valve 206, through the bypass gate 218, through the bypass inlets 204 and into the throttle bodies 108 downstream of the throttle valves 112. The air intake bypass device 210 thus increases the intake capacity of the engine 12 because air is drawn in both through the throttle valves 112 and through the air intake bypass device 210. The additional air intake raises the engine's rpm, thus increasing watercraft thrust and allowing the rider to more easily perform docking maneuvers, as described above. In addition, the additional air intake stabilizes the engine's idle and prevents stalling.

Of course, the foregoing description is that of preferred constructions having certain features, aspects and advantages in accordance with the present invention Accordingly, various changes and modifications may be made to the above-described arrangements without departing from the spirit and scope of the invention, as defined by the appended claims.

What is claimed is:

1. A watercraft comprising a hull defining an engine compartment, a steering mechanism configured to affect a direction of travel of the watercraft, an internal combustion engine disposed within the engine compartment, the engine including an engine body defining at least one combustion chamber, an air induction system including an air intake chamber having an inlet, at least one throttle body having an inlet end in fluid communication with the air intake chamber and at least one throttle valve providing selective fluid communication between the inlet end and the at least one combustion chamber, an air intake bypass device configured to connect the air intake chamber and the at least one throttle body at a point downstream from the at least one throttle valve in a direction of air flow from the air intake chamber to the at least one combustion chamber, and a user-operable switch that is actuatable independently from the steering mechanism, the air intake bypass device being configured to adjust an amount of air passing therethrough based on an output of the user-operable switch.

2. The watercraft of claim 1, wherein the air intake bypass device includes one output port for each combustion chamber in the engine.

3. The watercraft of claim 1, wherein the air intake bypass device comprises at least one inlet in fluid communication with the air intake chamber.

4. The watercraft of claim 1, wherein the air intake bypass device comprises at least one outlet in fluid communication with the at least one throttle body at a point downstream from the at least one throttle valve in a direction of air flow from the air intake chamber to the at least one combustion chamber.

5. The watercraft of claim 1, wherein the air intake bypass device comprises a bypass valve.

6. The watercraft of claim 5, wherein the bypass valve is movable between a closed position in which all air entering the engine passes through the at least one throttle valve, and an open position in which air entering the engine passes through both the at least one throttle valve and the air intake bypass device.

7. The watercraft of claim 6, wherein the air intake bypass device comprises an actuator that moves the bypass valve between the closed position and the open position.

8. A watercraft comprising a hull defining an engine compartment, an internal combustion engine disposed within the engine compartment, the engine including an engine body defining at least one combustion chamber, an air induction system including an air intake chamber having an inlet, at least one throttle body having an inlet end in fluid communication with the air intake chamber and at least one throttle valve providing selective fluid communication between the inlet end and the at least one combustion chamber, an air intake bypass device configured to connect the air intake chamber and the at least one throttle body at a point downstream from the at least one throttle valve in a direction of air flow from the air intake chamber to the at least one combustion chamber, and a user-operable, the air intake bypass device being configured to adjust an amount of air passing therethrough based on an output of the user-operable switch, wherein the air intake bypass device comprises a bypass valve, wherein the bypass valve is movable between a closed position in which all air entering the engine passes through the at least one throttle valve, and an open position in which air entering the engine passes through both the at least one throttle valve and the air intake bypass device, wherein the air intake bypass device comprises an actuator that moves the bypass valve between the closed position and the open position, wherein the actuator comprises a stepper motor.

9. A watercraft comprising a hull defining an engine compartment, a moveable steering mechanism configured to affect a direction of travel of the watercraft, an internal combustion engine disposed within the engine compartment, the engine including an engine body defining at least one combustion chamber, an air induction system including an air intake chamber having an inlet, at least one throttle body having an inlet end communicating with the air intake chamber and at least one throttle valve configured to meter an amount of air flowing to the combustion chamber, and means for allowing a rider to increase selectively a speed of the engine without changing a position of the throttle valve regardless of a position of the steering mechanism.

10. The watercraft of claim 9, wherein the means for allowing comprises a bypass valve having a closed position in which no intake air passes to the at least one throttle body at a point downstream from the at least one throttle valve, and an open position in which intake air passes to the at least one throttle body at a point downstream from the at least one throttle valve.

11. The watercraft of claim 10, wherein the bypass valve moves to the open position when the watercraft nears a dock.

* * * * *